United States Patent [19]
Nerin et al.

[11] Patent Number: 6,100,516
[45] Date of Patent: Aug. 8, 2000

[54] VELOCITY MEASUREMENT DEVICE AND LASER RANGE FINDER USING A COHERENT DETECTION

[75] Inventors: Philippe Nerin, Nages et Solorgues; Pascal Besesty, Vaulnaseys le Haut; Engin Molva; Germain Chartier, both of Grenoble, all of France

[73] Assignee: Commissariat a l'Eneriqie Atomigue, Paris, France

[21] Appl. No.: 09/077,201

[22] PCT Filed: Oct. 13, 1997

[86] PCT No.: PCT/FR97/01822

§ 371 Date: Jul. 15, 1999

§ 102(e) Date: Jul. 15, 1999

[87] PCT Pub. No.: WO98/16844

PCT Pub. Date: Apr. 23, 1998

[30]       Foreign Application Priority Data

Oct. 14, 1996 [FR] France .................... 96 12493

[51] Int. Cl.[7] ...................................... G01B 9/02
[52] U.S. Cl. ........................ 250/206.2; 356/28.5
[58] Field of Search ............... 250/206.2; 356/5.09, 356/28.5, 141.1; 331/94.4 C, 94.5 C; 330/4.3

[56]             References Cited

U.S. PATENT DOCUMENTS

| | | |
|---|---|---|
| 3,732,013 | 5/1973 | Hieslmair et al. . |
| 4,611,912 | 9/1986 | Falk et al. . |
| 5,069,545 | 12/1991 | Heinz . |
| 5,114,226 | 5/1992 | Goodwin et al. . |
| 5,594,543 | 1/1997 | de Groot et al. ............. 356/5.09 |
| 5,737,070 | 4/1998 | Kato ............................. 356/28.5 |
| 5,910,839 | 6/1999 | Erskine ........................ 356/28.5 |

FOREIGN PATENT DOCUMENTS

| | | |
|---|---|---|
| 0 392 172 | 10/1990 | European Pat. Off. . |
| 0 164 181 | 12/1993 | European Pat. Off. . |
| 2 251 150 | 6/1992 | United Kingdom . |

OTHER PUBLICATIONS

Analysis of Heterodyne Efficiency For Coherent Laser Radars, Stuart Fowler; SPIE vol. 1936 Applied Laser Radar Technology (1993) pp. 137–146.

Heterodyne Detection: phase front alignment, beam spot size, and detector uniformity, Steven C. Cohen; Applied Optics, vol. 14, No. 8 Aug. 1975, pp. 1953–1959.

The Antenna Properties of Optical Heterodyne Receivers, A. E. Siegman, Applied Optics vol. 5, No. 10, Oct. 1966 pp. 1588–1594.

Frequency–Modulated ND: Yag Micro Chip Lasers, J.J. Zayhowski and A. Mooradian, Optics Letters vol. 14, No. 12, Jun. 15, 1989.

*Primary Examiner*—Stephone B. Allen
*Attorney, Agent, or Firm*—Burns Doane Swecker & Mathis L.L.P.

[57]                ABSTRACT

The invention relates to a velocity measurement device of the coherent detection type comprising:

an active laser medium (10), an input mirror ($M_1$) and a first output mirror ($M_3$) defining, with the laser medium, a first resonant cavity of quality factor $Q_{max}$ making it possible to emit a laser beam (4), a second output mirror ($M_2$) defining, with the active laser medium (10) and the input mirror ($M_1$), a second resonant cavity of quality factor $Q_{min}$ ($<Q_{max}$), making it possible to amplify a measuring signal from a target which has intercepted the laser beam (4) emitted with the aid of the first resonant cavity.

13 Claims, 6 Drawing Sheets

VELOCITY MEASUREMENT DEVICE AND LASER RANGE FINDER USING A COHERENT DETECTION

TECHNICAL FIELD

The invention relates to an optical device using a coherent detection, more particularly applied to velocity measurement and laser rangefinding. Other applications of the invention are e.g. the chemical analysis of gaseous constituents, the analysis of velocity ranges, contactfree metrology, laser imaging and medical instrumentation.

PRIOR ART

At optical wavelengths, coherent detection encounters various problems, particularly the problems of matching fields to the detector (phase matching and amplitude matching), as well as intensity and phase fluctuations of the optical signal caused by the interaction of the beam with disturbed media.

Various solutions are known for solving these first two problems.

Thus, for bringing about an optimum interference of the fields on the detector, various conditions have been established in the articles by A. E. Siegman entitled "The antenna properties of optical heterodyne receivers", published in Applied Optics, vol. 5, No. 10, October 1966, pp 1588–1594, S. C. Cohen, entitled "Heterodyne detection: phase front alignment, beam spot size, and detector uniformity", published in Applied Optics, vol. 14, No. 8, August 1975, pp 1953–1959 and St. Fowler et al, entitled "Analysis of heterodyne efficiency for coherent laser radars", published in SPIE, vol. 1936, 1993, pp 137–146. In particular, the alignment tolerances are given by the Siegman's theorem in the article by this author referred to hereinbefore:

$$A_R \Omega_R = \lambda^2 \quad (1)$$

$A_R$ is the equivalent reception surface and $\Omega_R$ is the solid detection angle. In general, the above relation is proved for extremely low values of $\Omega_R$. This leads to particularly tight alignment tolerances, which partly explain the difficulties of implementing coherent detection at short wavelengths.

In order to get round the alignment problems, various procedures have been proposed in EP-164 181, U.S. Pat. No. 5,114,226 and U.S. Pat. No. 4,611,912.

In EP-164 181, use is made of an optical fibre device and a coupler for mixing the two beams. In U.S. Pat. No. 5,114,226 use is made of a modified form of the Michelson interferometer, which incorporates a reflex reflector, a polarizer cube and a λ/4 plate. In U.S. Pat. No. 4,611,912, an interferometer having a single measuring arm is implemented by introducing a partly reflecting plate into the measuring beam.

These complex arrangements have made it possible to produce industrial devices, which remain fragile, onerous and dimensions incompatible with a microsystem approach for large scale or collective manufacture.

Various proposals have been made for minimizing the effects of speckle. The theorem of Van Cittert Zernike supplies a criterion for dimensioning the reception pupil by expressing the coherence radius ρc at the pupil, as a function of the wavelength λ and the apparent diameter $\theta_s$ of the laser spot on the target:

$$\rho_c = \frac{\lambda}{\theta_s} \quad (2)$$

This formula indicates that the optimum detection conditions are obtained when the emission and reception pupil have the same dimension and when the beam is focussed on the target. This approach is described in EP-164 181 and U.S. Pat. No. 5,114,226, the focussing distance being fixed by construction, which gives the device a field depth of a few metres around the focussing point. In order to increase the field depth, an alternative is to use a dynamic focussing system. The latter approach is prejudicial for two reasons, namely the low speed of the measurements and the complexity of the device. Mode filtering can be obtained by using monomode filters, but a major problem is constituted by the coupling difficulties. In U.S. Pat. No. 4,611,912, the measuring beam is collimated and a spatial filtering is used in the focal plane of the reception optics. This procedure is difficult to implement, it being difficult to install a very small diaphragm of approximately 10 μm in the focus of the reception optics and significantly attenuates the signal.

DESCRIPTION OF THE INVENTION

The present invention proposes a device making it possible, particularly at short wavelengths (particularly between 0.5 and 2 μm) to improve the alignment on the detector between the optical reference signal and the optical measuring signal.

More specifically, the present invention relates to a velocity measurement device of the coherent detection type comprising:

an active laser medium, an input mirror and a first output mirror defining, with the laser medium, a first resonant cavity of quality factor $Q_{max}$ making it possible to emit a laser beam, a second output mirror defining, with the active laser medium and the input mirror, a second resonant cavity of quality factor $Q_{min}$ ($<Q_{max}$), making it possible to amplify a measuring signal from a target which has intercepted the laser beam emitted with the aid of the first resonant cavity.

Thus, the amplifier material is used for amplifying the measuring signal.

The invention also relates to a velocity measurement and rangefinding device incorporating a device of the type described hereinbefore, as well as means for modulating the emission frequency of the laser.

BRIEF DESCRIPTION OF THE DRAWINGS

The features and advantages of the invention will be more clearly understood from the following description of non-limitative embodiments and with reference to the attached drawings, wherein show.

DETAILED DESCRIPTION OF EMBODIMENTS OF THE INVENTION

A first embodiment of the invention will be described relative to FIGS. 1 to 3.

Figure 1:
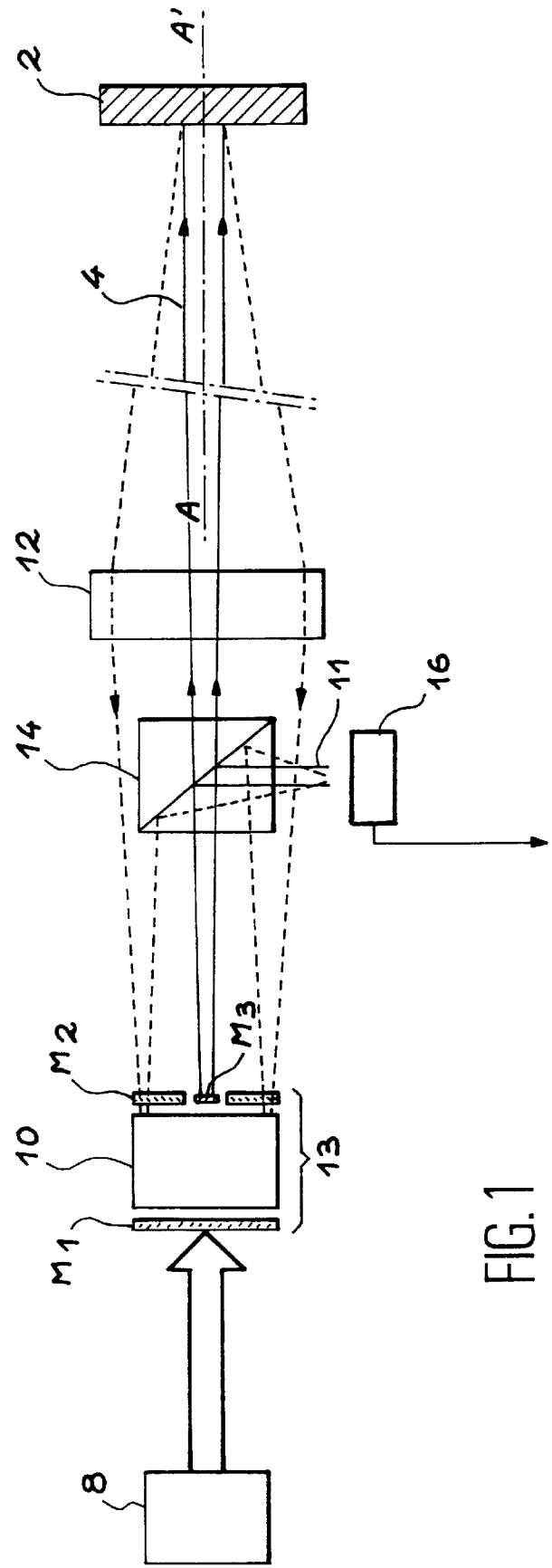
FIG. 1 A first embodiment of the invention.
Figure 2:
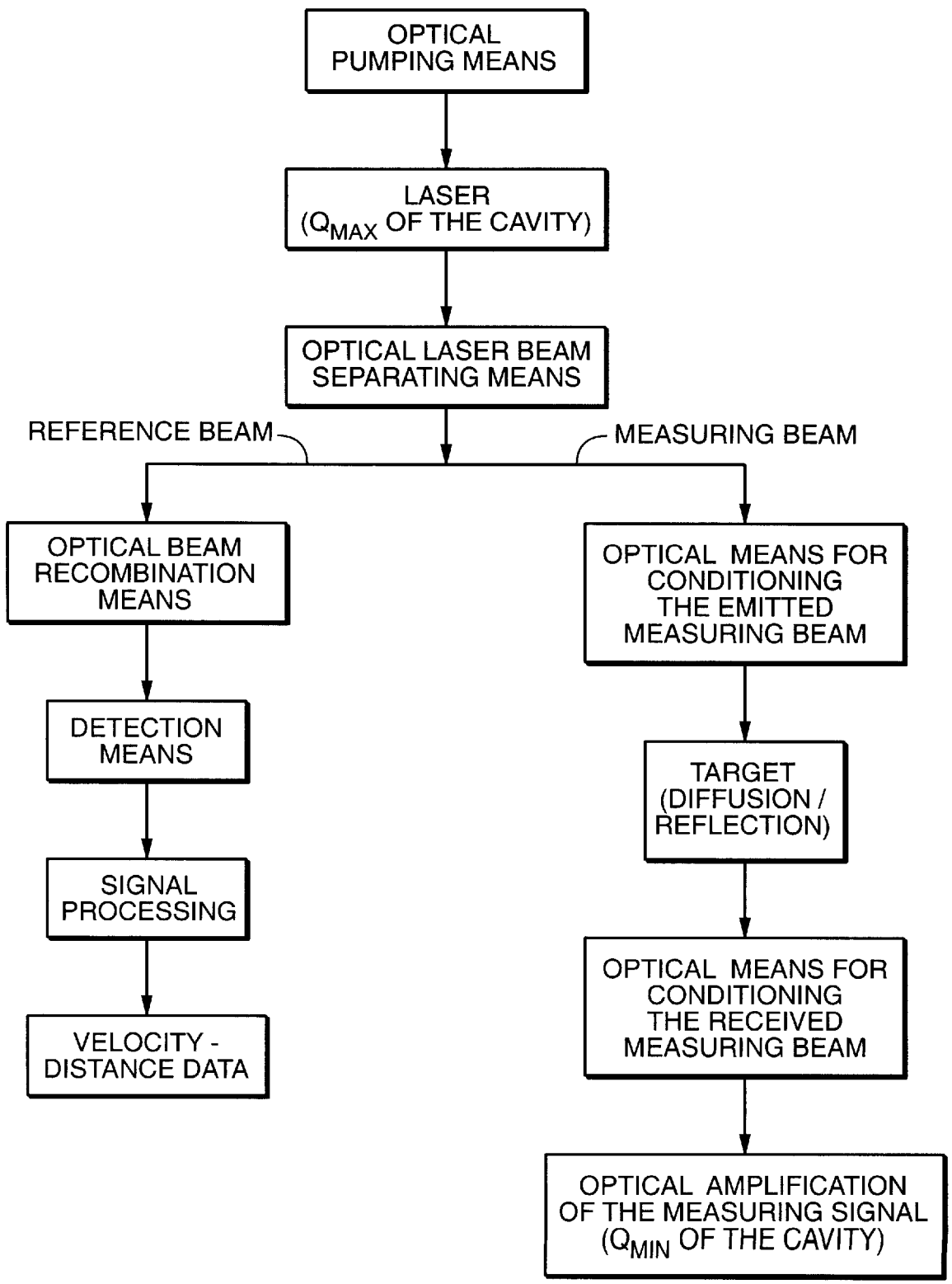
FIG. 2 Stages in a operating process for a device according to the invention.

FIG. 1 shows a velocity measuring device, which makes it possible to measure the projection of the velocity vector, on the optical axis AA', of a target, which intercepts a continuous laser beam 4, emitted by the velocity measuring device 6.

The device comprises two subassemblies. The first subassembly constitutes the emission part and the second subassembly constitutes the reception part.

The emission subassembly comprises:

an optical means 8 for pumping a laser amplifier material 10, an optical emission means 12, a cavity 13 having two quality factors ($Q_{max}$ and $Q_{min}$), in which is placed the laser amplifier material 10, said two quality factors being obtained by using mirrors of different reflectivities: mirrors $M_1$, $M_2$ and $M_3$, means 14 (e.g. a beam splitter) for sampling a reference beam 11 on the emitted beam 4 and delivering it to the photodetection means 16.

Thus, the three mirrors $M_1$, $M_2$, $M_3$ make it possible to define two resonators, each having its own quality factor.

The quality factor of a resonator delimited by a reflectivity mirror $R_1$ and a reflectivity mirror $R_2$ is defined by the relation:

$$Q = \omega \frac{\text{energy stored in the resonator}}{\text{power dissipated by the resonator}} \simeq \frac{nl}{C[\alpha l - \ln(\sqrt{R_1 R_2})]}$$

in which $R_1$, $R_2$ are reflectivities of the mirrors at a wavelength $\lambda_L$, l is the length of the cavity, $\alpha$ represents the linear losses, c the velocity of light and n the refractive index of the amplifying material.

The laser amplifying medium can e.g. be constituted by a basic material chosen from among $Y_3Al_5O_{12}$, $LaMgA_{11}O_{19}$, $YVO_4$, $Y_2SiO_5$, $YLiF_4$ or $GdVO_4$ and can be doped with neodymium (Nd, for an emission of 1.06 μm), erbium (Er, for an emission around 1.5 μm), thulium (Tm, for an emission around 2 μm), holmium (Ho, for an emission around 2 μm) ions, or with a codoping of erbium and ytterbium ions (Er+Yb, for an emission around 1.5 μm), or with a codoping of thulium and holmium (Tm+Ho, for an emission around 2 μm).

The amplifying medium can be that of a microlaser. Such a device makes it possible to emit a very circular, low divergence, monomodal ($TEM_{00}$) beam and also permits the use of a simple optics for collimating it (which is impossible with a laser diode). Use is made of a fixed optics for making the beam parallel.

The mirrors $M_1$, $M_2$ and $M_3$ are preferably dichroic mirrors, obtained by a multilayer dielectric treatment making it possible to have the desired reflectivity for each of them.

Mirror $M_3$ is placed in the centre of the face of the microlaser by which is emitted the laser beam 4, whilst $M_2$ is placed around $M_3$ on the same face.

The reception subassembly comprises:

an optical means 12 for the reception of the laser light reflected by the object 2, an optical means 14 for recombining the reference beam 11 and the measuring beam, a detection assembly, e.g. incorporating a photoelectric detector 16.

The operating process of the device described will now be explained in conjunction with FIGS. 1 and 2.

The pumping means 8 makes it possible to create a population inversion $N_O$ in the amplifying material 10. Mirrors $M_1$ and $M_3$ make it possible to select and confine a propagation mode. The association of the mirrors $M_1$ and $M_3$ forms an optical resonator, whose quality factor is designated $Q_{max}$. The reflectivity of the mirror $M_1$ is designated $R_{max}$ for the laser emission wavelength $\lambda_L$. The transmission of the mirror $M_1$ is designated $T_{max}$ at the pumping wavelength $\lambda_p$. The association of the mirrors $M_1$ and $M_2$ forms an optical resonator, whose quality factor is designated $Q_{min}$. The reflectivity of the mirror $M_2$ at $\lambda_L$ is designated R and its transmission at $\lambda_p$ is designated T. The minimum population inversion in order to have a laser emission is designated $N_{th}$.

For $N_O > N_{th}$, there is a maintained laser oscillation in the central zone of the amplifier, where the quality factor is equal to $Q_{max}$, a laser beam 4 being emitted by the mirror $M_3$. The complimentary zone, where there is a population inversion $N_O$, is used as an optical amplifier in reception. There is no laser oscillation in this zone, because the quality factor is too low for the considered population inversion $N_O$.

At the output of the mirror $M_3$, the laser beam is separated by an optical separating means 14. One part 11 of the beam serves as a reference and passes to the detection means 16. The other part of the beam is supplied to the target by the optical emission means 12. The measuring beam 4 is diffused or reflected by the target 2. A fraction of the energy propagates towards the optical reception means 12, which re-reflects the measuring beam to the optical amplifier constituted by the amplifying material 10 and the mirrors $M_1$ and $M_2$. After amplification in this structure (in the peripheral area of the active laser medium), the beam returns in the direction of the optical beam recombination means 14. Part of the amplified signal is supplied to the detection means 16, where it interferes with the reference beam 11. The result of the interference makes it possible to extract the velocity information from the target. The Doppler frequency present in the measuring signal is equal to:

$$V_D = v_0 \frac{V}{C} \quad (1)$$

where $v_O$ is the laser emission frequency and the frequency of the reference signal on the detector, V is the projection, on the optical axis AA', of the target velocity and where C is the velocity of light.

Following the filtration and conversion of the photocurrent, the signal is written:

$$S(t) = [I_R I_M]^{1/2} R(v_D) \cos(2\pi v_D t) \quad (2)$$

in which $I_R$ is the reference intensity, $I_M$ the intensity of the measuring signal, $R(v_D)$ the conversion coefficient taking into account the effect of the photoelectron conversion on the detector, the various optical and electrical efficiency characteristics of the system and, optionally, the coupling effects in the waveguide.

The processing of the signal of (2) makes it possible to determine the Doppler frequency and therefore the velocity of the target in accordance with formula (1). This processing can be carried out with the aid of an especially programmed, conventional computer.

In the above-described device, the alignment between the optical reference signal 11 and the optical measuring signal, reflected or diffused by the target, is ensured by the fact that the mirrors of the laser amplifier are used as the reference for the alignment of the optical components. The axis of the mirror $M_3$ and the axis of the mirror $M_2$ coincide with the axis of the laser beam 4 by design. Thus, $M_2$ and $M_3$ can be taken as reference surfaces for aligning on the detector, following reflection on said mirrors $M_2$ and $M_3$, the reference and measuring beams.

The use, at the output of the device, of a waveguide 18, e.g. of reduced length, makes it possible to carry out mixing of the reference signal and the measuring signal. Filtering is obtained by using a small number of propagation modes in the guiding structure and, in the best of cases, the single fundamental mode.

Finally, the amplifying material 10 and part of the laser cavity make it possible to amplify the measuring signal, which is very advantageous in the case where the latter results from the diffusion or reflection of the laser beam on a non-cooperative target.

Another embodiment of the invention relates to a velocity measuring-rangefinding device, which permits the measurement of the projection of the velocity vector on the optical axis AA', as well as the target-sensor distance of a target 2, which intercepts the laser beam 4. This optical device uses a laser, whose emission frequency is modulated.

It incorporates all the elements of the device described relative to FIG. 1, particularly for the "reception" part. The emission part differs from the emission subassembly described hereinbefore, in that the laser emission frequency is modulated.

Various modulation processes have already been described, e.g. in the article by J. J. Zayhowski et al, entitled "Frequency modulated Nd:YAG microchip laser", published in Optics Letters, vol. 14, No. 12, Jun. 15, 1989, p 618:
- electrooptical modulation,
- piezoelectric modulation,
- mechanical modulation,
- thermal modulation.

The present invention covers all types of means permitting the obtaining of a laser emission frequency modulation. Exemplified embodiments of such a device are given hereinafter. The operating principle of the velocity measurement-rangefinding device is as follows.

The optical paths (laser beam, reference beam, target-diffused or reflected beam) are the same as those described hereinbefore for the velocity measuring device and in particular there is still an amplification of the measuring signal in the medium 10, following reflection or diffusion by the target.

In coherent detection, a modulation of the laser emission frequency permits the measurement of a distance. Various modulation forms have been proposed. An example of a modulation in double ramp form in accordance with FIG. 3, is given:

for $0<t<T/2$ (modulo T), we have:

$$v(t) = v_0 + \Delta \frac{t}{T/2},$$

and
for $T/2<t<T$ (modulo T), we have:

$$v(t) = v_0 + 2\Delta - \Delta \frac{t}{T/2},$$

where T is the modulation recurrence period and where $\Delta$ is the maximum laser emission frequency excursion.

After processing (whilst taking account of the modulation of the laser emission frequency and the Doppler effect), the photoelectric signal is written:

for $\tau<t<T/2-\tau$ (modulo T):

$$S(t)=2[I_R I_M]^{1/2} R(F_{b1}) \cos [2\pi.F_{b1}t+2\pi v_O],$$

where $$F_{b1} = \Delta \frac{\tau}{T} + \frac{V}{C} \tag{3}$$

and for $T/2+\tau<t<T-\tau$ (modulo T):

$$S(t)=2[I_R I_M]^{1/2} R(F_{b2}) \cos [2\pi.F_{b2}t+2\pi v_O],$$

where $$F_{b2} = \Delta \frac{\tau}{T} - \frac{V}{C} \tag{4}$$

Thus, the measurement of the beat frequencies on each time interval makes it possible to determine the velocity and distance of the object from the sensor. By forming the sum and then the difference of the beat frequencies $Fb_1$ and $Fb_2$, there is a calculation of the distance and velocity:

$$V = \frac{F_{b1} - F_{b2}}{2} \frac{C}{v_0} \tag{5}$$

and $$R = \frac{F_{b1} + F_{b2}}{2} \frac{TC}{4\Delta} \tag{6}$$

Once again the processing of the signal can be carried out with the aid of data processing means (microcomputer), especially programmed for this purpose.

Other embodiments of devices according to the invention will now be given in conjunction with FIGS. 4 to 6, in which numerical references identical to those of FIG. 1 designate identical or equivalent elements.

Figure 3:
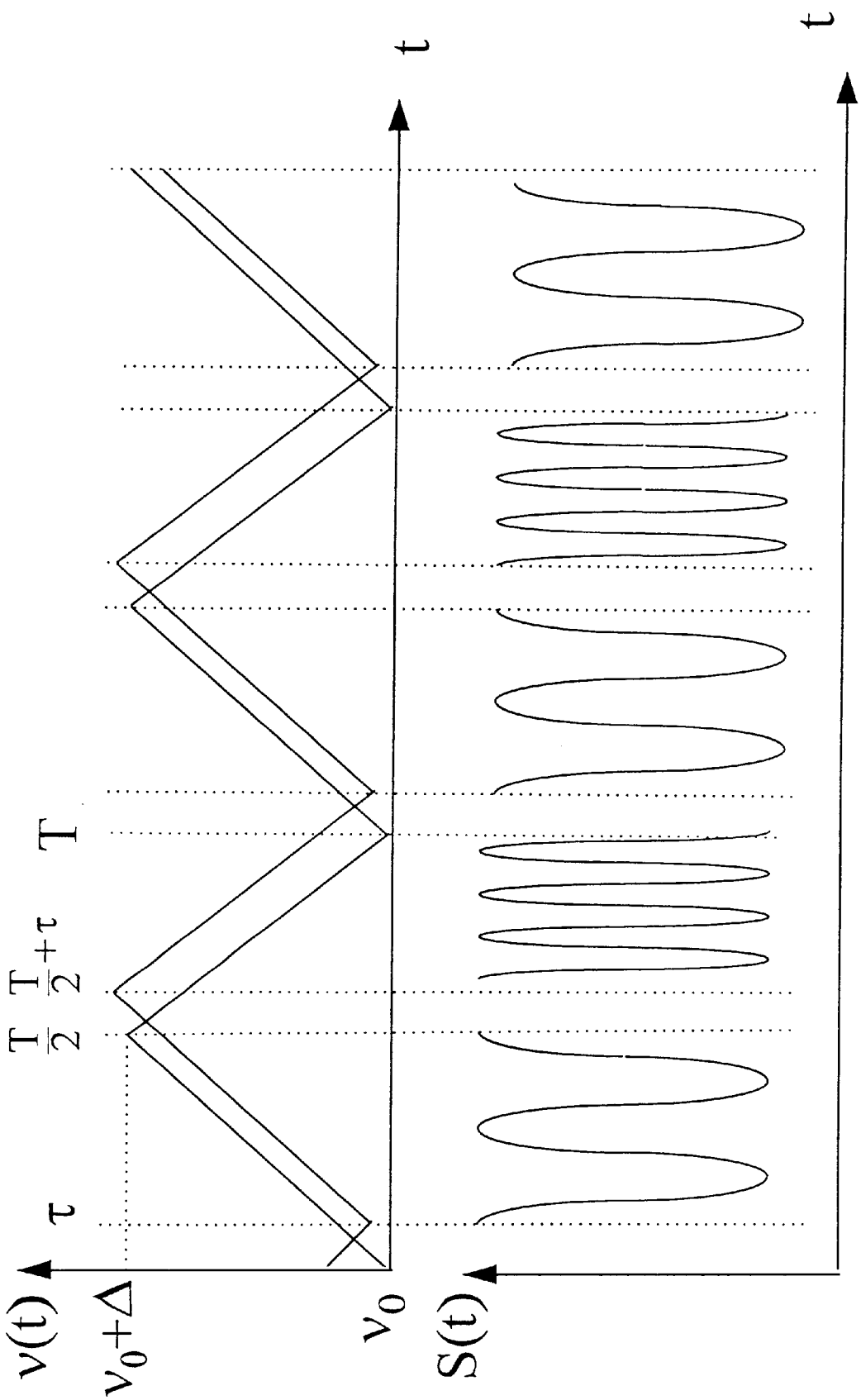
FIG. 3 A timing diagram of the frequency modulation and measured signal of a device according to the invention.

In FIG. 3, the pumping means 8 is a laser diode collimated by a lens 30. The amplifying medium is that of a $Nd^{3+}$-doped YAG microlaser. The mirror $M_1$ is obtained by a multilayer dielectric treatment in order to have $T_{1max}$ 99% at 0.810 μm, $R_{1mam}$ 99% at 1.064 μm. Mirrors $M_2$ and Mo3 are obtained by a deposition of the multilayer type. A first treatment phase can be common to the mirrors $M_2$ and $M_3$. The microlens 30 then undergoes a complimentary treatment in order to have the desired characteristics at $\lambda_L$. The transmission and reflection coefficients of the structure are as follows:

$M_2$: $R_2$=0.8 at 1.064 μm and $R_2$ maximum at 0.810 μm,
$M_3$: $R_3$=0.98 at 1.064 μm and $R_3$ maximum at 0.810 μm.

The beam separation/recombination means 14 is implemented by a separating or splitting cube. The detection means is constituted by a waveguide 18 and a photoelectric detector 16. The optical emission-reception means 12 is implemented by a lens.

Figure 5:
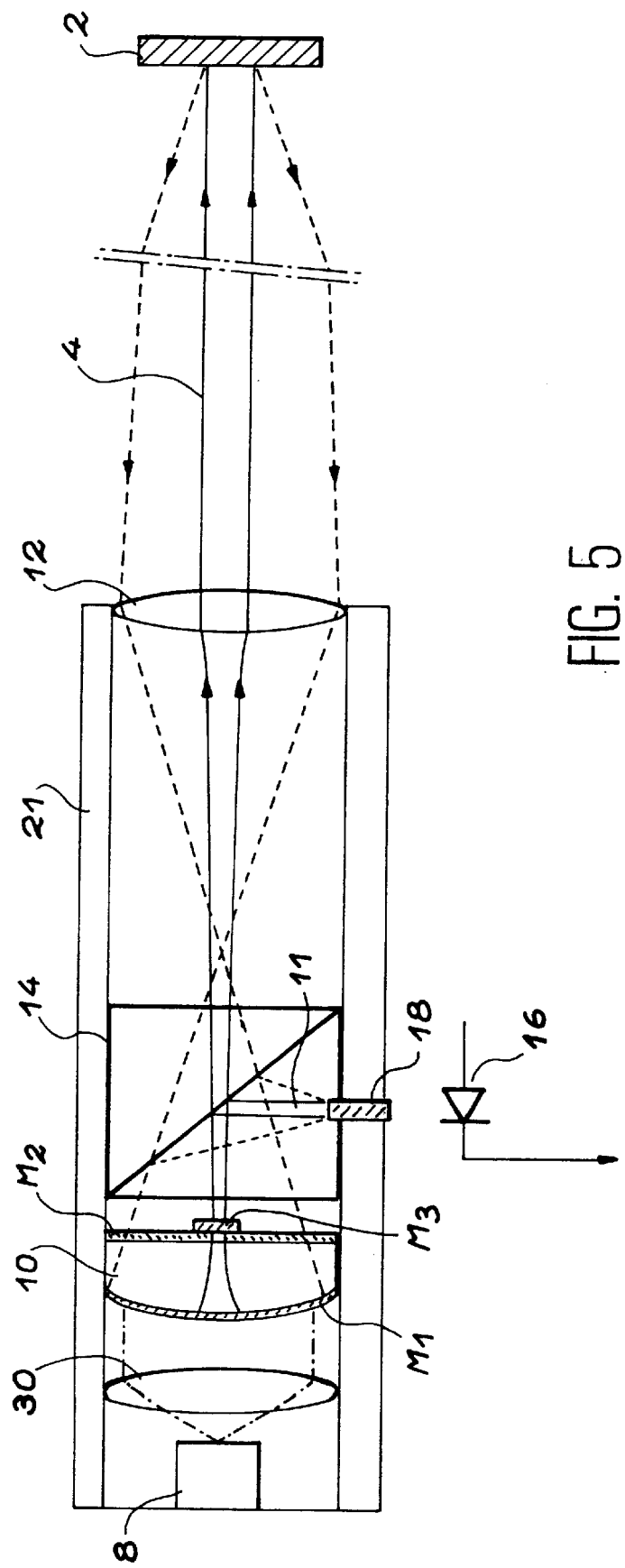

In the embodiment of FIG. 5, the mirror $M_2$ has a zero reflectivity at 1.064 μm (antireflection treatment at the laser emission wavelength $\lambda_L$). The pumping means 8 is a laser diode collimated by a lens 30. A spherical mirror $M_1$ is directly produced on the amplifying material and a multilayer deposit is made on the surface in order to have $R_{1max}$>0.99 at $\lambda_L$ and $T_{1max}$>0.99 at $\lambda_p$. The centre of curvature C of this mirror $M_1$ is at the focal distance F of the lens 12. The detection means is constituted by a waveguide 18 and a photoelectric detector 16.

The beam separating/recombining means 14 is constituted by a separating or divider cube. The lens 12 makes it possible to collimate the laser beam on emission and focus the measuring beam at the centre of curvature C.

Figure 6:
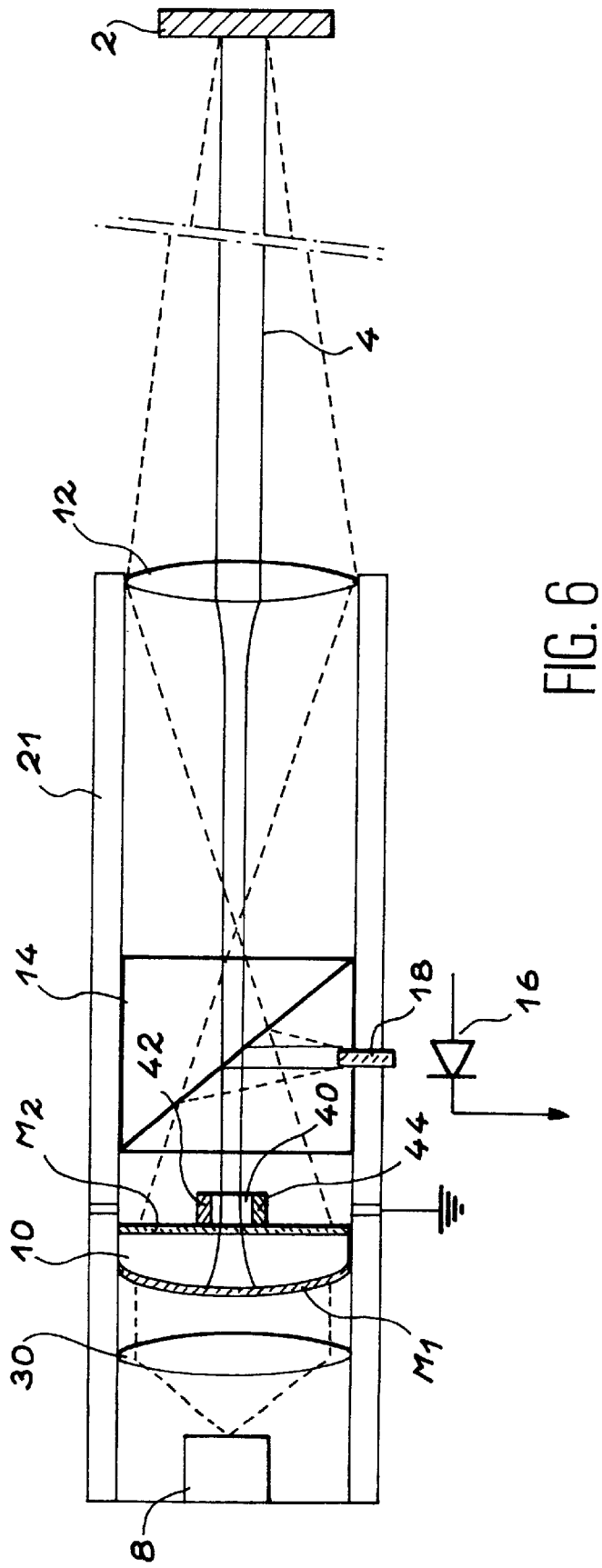

The embodiment of FIG. 6 uses the same elements as that of FIG. 5, but additionally has an electrooptical modulation element. An electrooptical material 40 is bonded to the antireflection layer formed at the output of the microlaser. Electrodes 42, 44 are deposited on the electrooptical material in order to introduce the modulation signal in the manner described in the article referred to hereinbefore by Zayhowski et al.

Figure 4:
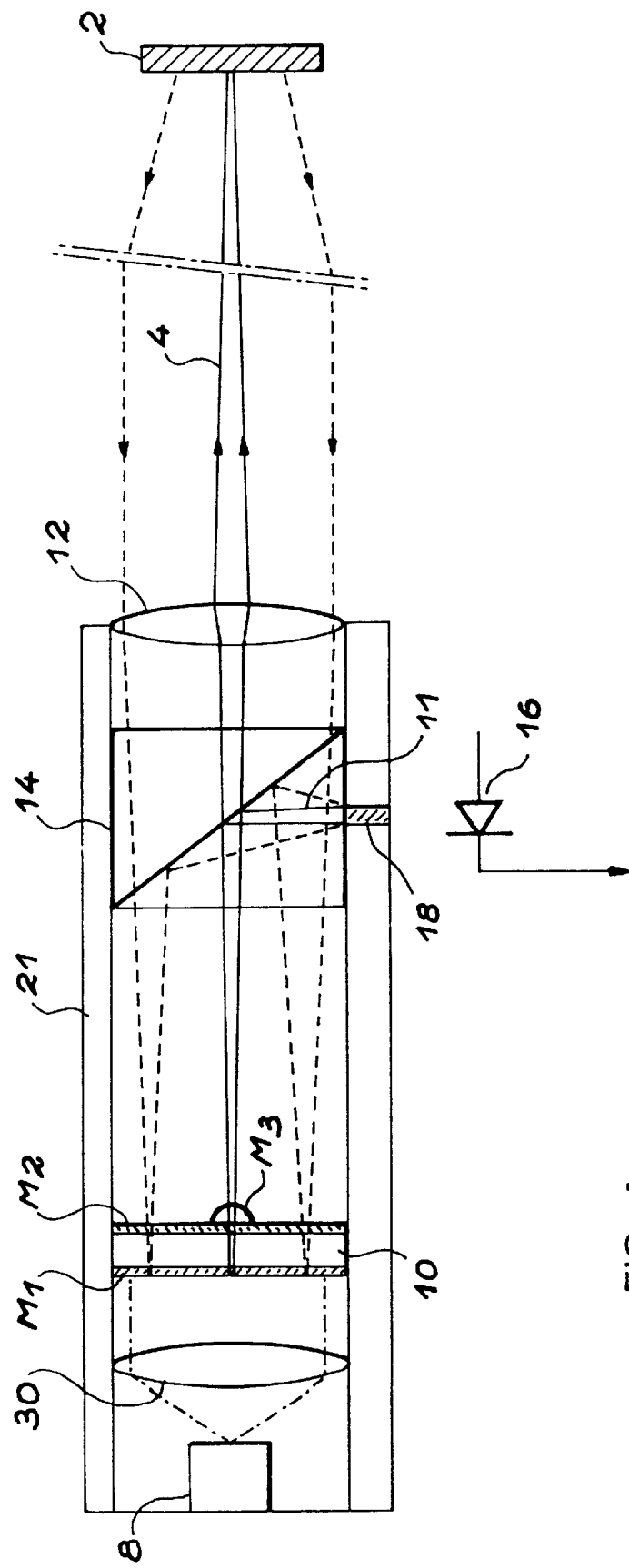
FIGS. 4 to 6 Embodiments of a device according to the invention.

In general terms, the pumping means 8 is preferably adapted to the device:

when the microlaser cavity (mirror $M_1$, amplifying medium 10, mirror $M_3$) is stable (the cavity includes a microlens in the definition of the mirrors), said means has a single focal length: e.g. in FIGS. 4, 5 and 6 the pumping means is implemented by a collimated beam, p1 when the cavity is not stable (e.g. plane-plane cavity), pumping is implemented by a double focal length optical device.

The device according to the invention is compact and can be integrated (in the embodiments of FIGS. 4, 5 and 6 said device is integrated into a case or box 21), which allows a "microsystem" approach. Thus, the multimode waveguide 18 is integrated into the box 21 to which is fixed, with the aid of means which are not shown in the drawing, the detection device 16. This leads to a fool-proof, monolithic device. If the laser is a microlaser, the assembly is particularly compact.

What is claimed is:

1. Velocity measurement device of the coherent detection type comprising:

an active laser medium, an input mirror and a first output mirror defining, with the laser medium, a first resonant cavity of the quality factor $Q_{max}$ making it possible to emit a laser beam, a second output mirror defining, with the active laser medium and the input mirror, a second resonant cavity of qualify factor $Q_{min}(<Q_{max})$, making it possible to amplify a measuring signal from a target which has intercepted the laser beam emitted with the aid of the first resonant cavity.

2. Device according to claim 1 also incorporating means for sampling a reference beam from the laser beam.

3. Device according to claim 1, incorporating means for transmitting a laser beam in the direction of the target, for receiving a measuring signal from said target and for transmitting the latter to the active laser medium, in the second resonant cavity.

4. Velocity measuring and rangefinding device incorporating a device according to claim 1 and means for modulating the emission frequency of the laser.

5. Device according to claim 1, also incorporating means for processing a measuring signal, permitting the extraction there-from of a signal representative of the velocity of the target and/or a distance from the target.

6. Device according to claim 1, also incorporating means for filtering the amplified measuring signal.

7. Device according to claim 6, the filtering means incorporating a waveguide portion.

8. Device according to claim 1, the active laser medium being that of a microlaser.

9. Device according to claim 8, also incorporating means for sampling a reference beam from the laser beam.

10. Device according to claim 8, incorporating means for transmitting a laser beam in the direction of the target, for receiving a measuring signal from said target and for transmitting the latter to the active laser medium, in the second resonant cavity.

11. Device according to claim 8, also incorporating means for filtering the amplified measuring signal.

12. Velocity measuring and rangefinding device incorporating a device according to claim 8 and means for modulating the emission frequency of the laser.

13. Device according to claim 8, also incorporating means for processing a measuring signal, permitting the extraction there-from of a signal representative of the velocity of the target and/or a distance from the target.

* * * * *